(12) United States Patent
Kwan et al.

(10) Patent No.: US 6,796,636 B2
(45) Date of Patent: Sep. 28, 2004

(54) TWO SHOT MOLDED INKJET PRINTHEAD LID FOR LASER WELDING

(75) Inventors: Kin-Ming Kwan, Lexington, KY (US); Ganesh Vinayak Phatak, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 100 days.

(21) Appl. No.: 10/321,693

(22) Filed: Dec. 17, 2002

(65) Prior Publication Data

US 2004/0113969 A1 Jun. 17, 2004

(51) Int. Cl.⁷ .............................. B41J 2/16; B23P 17/00
(52) U.S. Cl. ..................... 347/49; 347/108; 29/890.1
(58) Field of Search ................. 347/49, 108; 29/890.1, 29/593, 832, 840; 219/121.63, 121.66, 121.6; 156/272.8

(56) References Cited

U.S. PATENT DOCUMENTS

| | | | |
|---|---|---|---|
| 4,023,005 A | 5/1977 | Bolin | |
| 4,404,453 A | 9/1983 | Gotman | |
| 4,424,435 A | 1/1984 | Barnes, Jr. | |
| 4,845,335 A | 7/1989 | Andrews et al. | |
| 4,874,920 A | 10/1989 | Yamazaki et al. | |
| 4,879,450 A | 11/1989 | Valentin et al. | |
| 4,970,368 A | 11/1990 | Yamazaki et al. | |
| 4,978,935 A | 12/1990 | Hoffman et al. | |
| 5,049,720 A | 9/1991 | Fang et al. | |
| 5,274,210 A | 12/1993 | Freedman et al. | |
| 5,481,082 A | 1/1996 | Yamamoto | |
| 5,537,133 A | 7/1996 | Marler et al. | |
| 5,567,336 A | 10/1996 | Tatah | |
| 5,829,125 A | 11/1998 | Fujimoto et al. | |
| 5,840,147 A | 11/1998 | Grimm | |
| 5,843,265 A | 12/1998 | Grimm | |
| 5,935,462 A | 8/1999 | Tatah | |
| 6,056,188 A | 5/2000 | Azdasht et al. | |
| 6,394,158 B1 | 5/2002 | Momeni | |
| 6,684,503 B1 * | 2/2004 | Silverbrook et al. | ........ 29/890.1 |

* cited by examiner

*Primary Examiner*—Lamson D Nguyen
(74) *Attorney, Agent, or Firm*—King & Schickli, PLLC

(57) ABSTRACT

An inkjet printhead lid has a light opacity component and a laser light transparent component molded together in two shots in an injection molding chamber. The laser light transparency component has a periphery that extends beyond a periphery of the light opacity component on substantially all sides thereof. An inkjet printhead body laser welds to the laser light transparency component in an area between the peripheries of the two lid components. Inkjet printers for containing the printhead are also disclosed. In the molding chamber, two sources of injection molding materials inject a first and then a second mold to mold the two lid components together. One of the two sources of injection molding materials has laser light transparency characteristics while the other has light opacity characteristics. Mechanical interlocking features may also exist in both of the two lid components.

6 Claims, 10 Drawing Sheets

TWO SHOT MOLDED INKJET PRINTHEAD LID FOR LASER WELDING

FIELD OF THE INVENTION

The present invention relates to inkjet printheads. In particular, it relates to printhead lids formed by two shot injection molding useful during laser welding of the lid to an inkjet printhead body.

BACKGROUND OF THE INVENTION

The art of inkjet printing is relatively well known. In general, an image is produced by emitting ink drops from an inkjet printhead at precise moments such that they impact a print medium, such as a sheet of paper, at a desired location. The printhead is supported by a movable print carriage within a device, such as an inkjet printer, and is caused to reciprocate relative to an advancing print medium and emit ink drops at such times pursuant to commands of a microprocessor or other controller. The timing of the ink drop emissions corresponds to a pattern of pixels of the image being printed. Other than printers, familiar devices incorporating inkjet technology include fax machines, all-in-ones, photo printers, and graphics plotters, to name a few.

A conventional thermal inkjet printhead includes access to a local or remote supply of color or mono ink, a heater chip, a nozzle or orifice plate attached to the heater chip, and an input/output connector, such as a tape automated bond (TAB) circuit, for electrically connecting the heater chip to the printer during use. The heater chip, in turn, typically includes a plurality of thin film resistors or heaters fabricated by deposition, masking and etching techniques on a substrate such as silicon.

To print or emit a single drop of ink, an individual beater is uniquely addressed with a small amount of current to rapidly heat a small volume of ink. This causes the ink to vaporize in a local ink chamber (between the heater and nozzle plate) and be ejected through and projected by the nozzle plate towards the print medium.

During manufacturing of the printheads, a printhead body gets stuffed with a back pressure device, such as a foam insert, and saturated with mono or color ink. A lid adheres or welds to the body via ultrasonic vibration. Ultrasonic welding, however, sometimes cracks the heater chip, introduces and entrains air bubbles in the ink and compromises overall printhead integrity. Adhesion has problems because of its impractically long cure time.

Even further, as demands for higher resolution and increased printing speed continue, heater chips are often engineered with more complex and denser heater configurations which raises printhead costs. Thus, as printheads evolve a need exists to control overall costs, despite increasing heater chip costs, and to reliably and consistently manufacture a printhead without causing cracking of the ever valuable heater chip.

Regarding the art of laser welding, it too is relatively well known. In general, with reference to FIG. 1, first and second work pieces, embodied as an upper work piece 100 laid on a lower work piece 120 along a weld interface 180, become welded to one another by way of an irradiated beam 140 of laser light. As is known, the beam 140 passes through the upper work piece, which is transparent to laser light, where it gets absorbed by the lower work piece, which is laser light absorbent. As the beam irradiates, the weld interface heats up and causes the bottom surface of the upper work piece and the upper surface of the lower work piece to melt and meld together. Upon cooling, a weld joint exists. An optical path between a laser light source (not shown) and the to-be-welded work pieces may include a lens 160, for proper focusing, or other optical elements, such as mirrors, fiber optic strands, scanning structures or other. A clamping device (not shown) typically provides a pressing engagement of the work pieces to maintain relative positioning and good surface contact during welding. The beam of laser light may advance relative to the parts, such as in contour welding, or may irradiate the substantial entirety of the weld interface at substantially the same time in a simultaneous welding operation.

As is apparent in FIG. 1, the upper work piece 100 comprises a generally homogeneous material that allows laser light to transit the work piece in area A at a substantially equivalent rate as compared to area B or any other area of the work piece.

Yet, when welding a lid (upper work piece) and body (lower work piece) of a container together, for example, sometimes a need exists to decorate, adorn, color code and/or emboss the lid and/or to hide the contents of the container from a user by making the lid opaque to visible light or other. In such instances, the lid may comprise constituents that make laser welding impractical, difficult or substantially impossible.

In the specific instance of making the lid opaque, perhaps to maintain the contents of a container secret, one presently known solution to the above includes the addition of an organic pigment to produce a homogeneous-composition lid that has laser light transparency characteristics and visible light opacity characteristics. As a result, a manufacturer can perform laser welding while still preventing a user from viewing the contents of the container. Such pigments, however, are exceptionally expensive and have limited chemical compatibility with some embodiments of lids.

Moreover, when an economic or other need exists to make at least the lid a plastic material, the above pigment solution often requires additional manufacturing steps such as painting or coating of the plastic to achieve the necessary opacity.

Accordingly, a need exists in the laser welding arts for economically and efficaciously laser welding two work pieces when one of the work pieces simultaneously requires laser light transparency characteristics and laser or visible light opacity characteristics.

SUMMARY OF THE INVENTION

The above-mentioned and other problems become solved by applying the apparatus and method principles and teachings associated with the hereinafter described two shot molded inkjet printhead lid for laser welding.

In one embodiment, an inkjet printhead lid has a light opacity and a laser light transparent component formed in two molds. Each of the lid components has a periphery and the laser light transparency periphery extends beyond the periphery of the light opacity component. Preferably, it extends beyond the periphery of the light opacity component on all sides thereof. Each of the lid components may comprise unique and varied shapes. In a particular embodiment, each of the lid components has a surface that exists substantially coplanar with the other. The lid components may further exist flush with one another or not. Mechanical and chemical interlocking features may or may not exist between the lid components.

An inkjet printhead becomes formed when an inkjet printhead body laser welds to the laser light transparent component of the lid. Preferably, the body welds to the laser light transparent component of the lid in an area between the peripheries of the two lid components. Contemplated techniques for laser welding the lid and body include advancing a laser beam in the area between the peripheries or simultaneously welding the area between the peripheries. Inkjet printers for containing the printhead are also disclosed.

In an injection molding chamber, two sources of injection molding materials inject first and then second molds to produce the two lid components. One of the two sources of injection molding materials has laser light transparency characteristics while the other has light opacity characteristics.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

Figure 1:
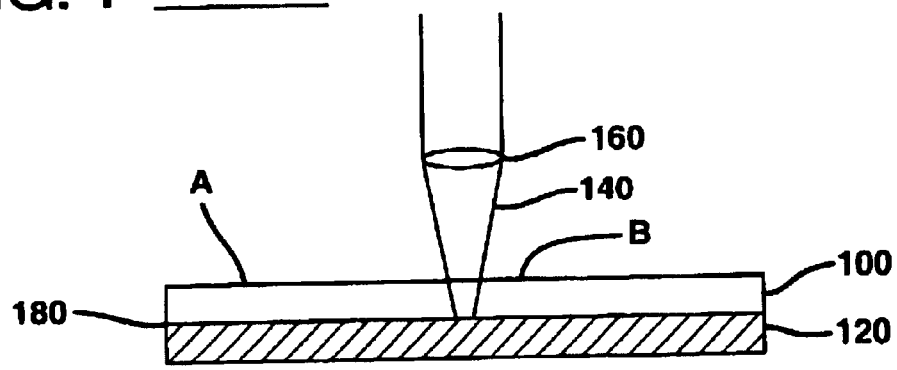
FIG. 1 is a diagrammatic view in accordance with the teachings of the prior art of two work pieces being laser welded together.

In the following detailed description of the preferred embodiments, reference is made to the accompanying drawings that form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process or other changes may be made without departing from the scope of the present invention. The following detailed description is, therefore, not to be taken in a limiting sense, and the scope of the present invention is defined only by the appended claims and their equivalents.

In accordance with the present invention, we hereinafter describe a molded inkjet printhead lid simultaneously having both laser light transparency and laser, visible or other light opacity characteristics. For manufacturing convenience, the invention contemplates forming such inkjet printhead lid with two shots of injection material in an injection molding chamber. The description for the molding chamber corresponds primarily to FIGS. 9A–9F while, in FIG. 2A through FIG. 6, the description corresponds to various embodiments of molding inkjet printhead lids in two shots/steps, to the inkjet printhead lids themselves and to diagrams of representative molds perhaps useful in the molding chamber of the later figures.

Accordingly, with reference to FIGS. 2A–2F, a first mold 200 has an interior 202 defined by wall sections 204 of some desired dimensions that yields an insert 210 of comparable dimensions upon injection and curing of a first molding material therein.

Those skilled in the art should appreciate, however, that while the insert has a rectangular solid shape, with a substantially rectangular surface in top and bottom planes 212, 214 and length and side planes 216, 214, that the invention embraces any shape of insert having any variety of dimensions. For example, the insert may alternatively embody a disc, a ball, a box, a sphere or a triangular, diamond, square, polygon or other solid shape or other. They should also appreciate that in the event the insert has an alternative shape, that other wall sections of shapes and sizes corresponding to the shape and size of the insert would likely replace the pluralities of wall sections 204 of the first mold 200. Still further, in the event the interior had, for example, a curved, round, oval or circular shape that a singular wall section would likely replace the pluralities of sections. The mold, and ultimately insert, also have a thickness t that may have uniformity or variety across the contours thereof.

Regardless of the shape and size of the insert 210, it thereafter becomes positioned relative to a second mold 220. As shown, the insert resides within an interior 222 of the second mold such that when a second injection material becomes injected into the interior it occupies the region between the walls 224 and a periphery 226 of the insert to mold the first and second injection materials into the composite inkjet printhead lid 230. Skilled artisans, however, should understand that various design constraints drive the ultimate shape and dimension of the inkjet printhead lid 230 and it may vary from application to application. Specific shapes may include those described above or other.

Since the present invention concerns itself with lids dually possessing light opacity and laser light transparency characteristics, it should be understood that the first and second injection materials have differing compositions one of which comprises light opacity characteristics and the other of which comprises laser light transparency characteristics. As such, the depicted inkjet printhead lid 230 has two components or portions one of which embodies laser light transparency characteristics (i.e., the outer lid portion 232) while the other embodies light opacity characteristics (i.e., the inner lid portion 210). As further shown, the outer lid portion 232 has a periphery 234 that extends beyond the periphery of the periphery 226 of the inner lid portion on substantially all sides thereof and each have at least one surface that exists substantially coplanar with the other surface. In this instance, an upper surface 283 of the inner lid portion and an upper surface 293 of the outer lid portion exist substantially coplanar with one another. The same is true of the lower surfaces (not shown) underneath the inkjet printhead lid 230 on side 295.

During welding, a beam 238 of laser light passes through an area 236 between the peripheries 226, 234 of the inner and outer lid portions where it gets absorbed by a lower work piece 240, an inkjet printhead body in this instance, which is laser light absorbent. As the beam irradiates, a weld interface 242 heats up and causes a bottom surface 244 of the area 236 and an upper surface 246 of the lower work piece to melt and meld together. Upon cooling, a weld joint exists. As a result, an inkjet printhead 250 results that has a laser welded lid and body, thereby avoiding heater chip cracking issues, and since the inner lid portion has light opacity characteristics, a user may not view the contents of an interior 252 of the inkjet printhead or a user may understand the color identification of the ink of the interior of the inkjet printhead by examining the color of the inner lid portion 210.

For simplicity, we depict a plurality of lenses 260 for focusing or otherwise controlling the beam of laser light during welding but those skilled in the art should appreciate that we greatly simplified the optical path and it may additionally include other optical structures such as mirrors, fiber optic strands, light waveguides, laser scanning devices (e.g., rotating multi-faceted mirrors), other lenses or other. Preferably, the beam of laser light originates from a laser source 262 such as a laser diode.

In one embodiment, the laser source represents an 810 nm wavelength Aluminum Gallium Arsenide (AlGaAs) semiconductor laser having a laser power of about 50 watts. Other embodiments include, but are not limited to, other types of continuous wave lasers with similar power intensity such as semiconductor lasers based on Indium Gallium Arsenide (InGaAs) with wavelengths 940–990 nm and Aluminum Gallium Indium Phosphide (AlGaInP) with wavelengths 630–680 nm, solid state lasers such as lamp pumped Neodymium-doped Yttrium Aluminum Garnet (Nd:YAG) with wavelength 1064 nm and diode pumped Neodymium-doped Yttrium Aluminum Garnet (Nd:YAG) with wavelength 1064 nm or other.

A clamping device, a pressing member or other (not shown) may be utilized to supply a pressing engagement between the lid and body to maintain relative positioning and insure good surface contact during welding. The beams 238 may either embody an advancing beam in area 236, relative to the lid and body, such as in contour welding, or may embody a simultaneous welding operation having the substantial entirety of the weld interface laser welded at substantially the same time.

Regarding compositions, the outer lid (second component) of the inkjet printhead lid that has laser light transparency characteristics is preferably substantially entirely transparent and comprises a polyphenylene ether plus polystyrene (PPE/PS) blend such as that found in transparent grade Noryl brand such as Noryl TN 240, TN300 and TN 310. Compositions of the inkjet printhead body, on the other hand, include, but are not limited to, general purpose polystyrene, high impact polystyrene, such as styrene-butadiene copolymers (CBC), styrene-acrylic copolymers (SMMA). Still others include polyesters and polyester blends including polyethylene terephthalate (PET), polybutylene terephthalate (PBT), as well as blends of these plus polycarbonate (PC), acrylonitrile styrene acrylic (ASA) or other resins or other. When the body is of a PET composition, preferred second component compositions include the foregoing and/or may additionally include copolyesters, glycol modified PET (PETG), glycol modified polycyclohexylenemethylene terephthalate (PCTG), and acid modified PCT (PCTA) or other. Suitable welds have also been found when the second component of the lid comprises materials having low loading levels of glass fiber such as natural PET (15% glass fiber) or blends of polyester types. Still other compositions include PC/PCTG, PC/PBT, PC/PET, PBT/PETG, PET/PBT, although these sometimes require laser power adjustment when welding to polyester inkjet printhead bodies. In still other embodiments, PBT/ASA was found to join to materials such as styrene methyl methacrylate (SMMA), and styrene acrylonitrile (SAN). One PET/PBT blend surprisingly formed good bonds with SMMA, clear ABS, ABS and methacrylate ABS (MABS). The materials discussed above are summarized in Appendix 1 ($2^{nd}$ material refers to the component of the inkjet printhead lid having laser light transparency characteristics). Bear in mind, compatibility with inks can also be considered when selecting suitable compositions when welding inkjet printhead lids to inkjet printhead bodies.

Heretofore described have been inkjet printhead lids having two components, one for transmitting, passing or otherwise propagating laser light and the other for blocking light. The transparency or opacity of these components, however, does not mean that 100% of light, laser or other, gets transmitted or blocked. The transparency of a component is sufficient if it allows enough light to transit there through to form an appropriate laser weld at a weld interface. The opacity of a component is sufficient if it blocks enough light such that color coding, container content hiding, or other light blocking function is accomplished. Conveniently, however, since transparency and opacity have generally opposite meanings, the transparency and opacity can become defined at least in relative terms. As such, a component that receives a beam of light is transparent if more light passes through than gets blocked and it is opaque if more light is blocked than passes through. Accordingly, a work piece may not be both opaque and transparent at the same time (provided, however, the inkjet printhead lid is being examined exclusively in regions of either the first or second component because, as we have described, one component is in fact laser light transparent while the other is light opaque). Still further, opacity and transparency applies herein simultaneously to various light sources, such as visible, laser, near and far infrared or other. Those skilled in the understand that many variables may influence the opacity or transparency of a component and include, but are not limited to: light source wavelength; light source power; distance of light source from the components; angles of incident light upon a component; light source focus; component dimensions, thickness, compositions, shapes, surface roughness and even temperature. In a preferred embodiment, the transparency of a component is selected such that at least 80% of the incident laser light impacting on a surface thereof passes through such component.

Figure 3:
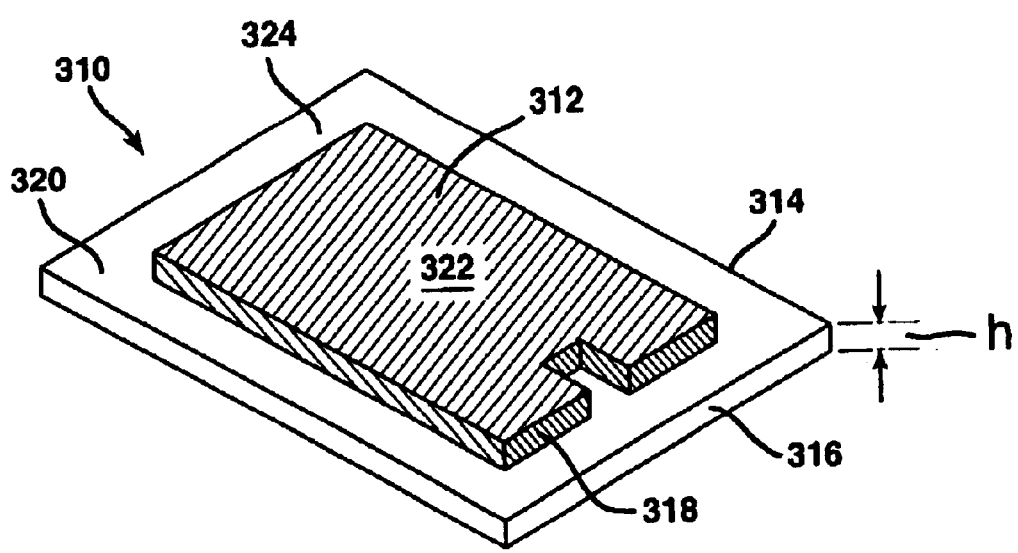
FIG. 3 is a perspective view in accordance with the teachings of the present invention of an alternate embodiment of two shot molded lid.
Figure 4A:
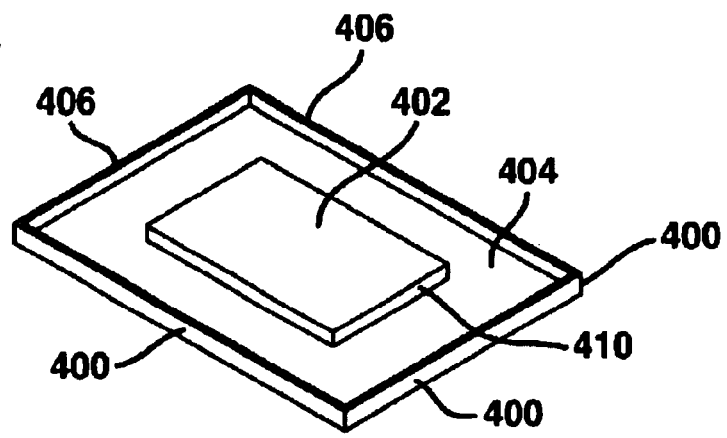
FIG. 4A is a diagrammatic perspective view in accordance with the teachings of the present invention of an alternate embodiment of a first mold.
Figure 4B:
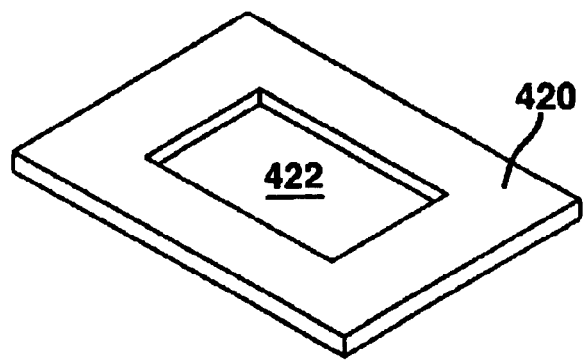
FIG. 4B is a diagrammatic perspective view in accordance with the teachings of the present invention of a second mold and outer lid molded from the first mold of FIG. 4A.
Figure 4C:
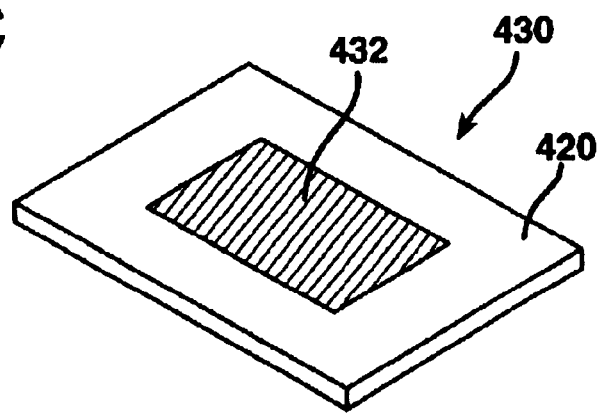
FIG. 4C is a diagrammatic perspective view in accordance with the teachings of the present invention of an alternate embodiment of a two shot molded lid.

With reference to FIG. 3, another embodiment of an inkjet printhead lid is disclosed generally as 310. Specifically, the lid has a first component 312 that has light opacity characteristics and a second component 314 that has laser light transparency characteristics. Each has a periphery and the periphery 316 of the second component extends beyond the periphery 318 of the first component on all sides thereof. Unlike the embodiment of FIG. 2D, this inkjet printhead lid 310 has first and second components that have upper surfaces 320, 322 that do not coplanarly exist. Again, although both have a generally rectangular solid structure, the two components can embody other known or original shapes. Like the embodiment of FIG. 2D, this inkjet printhead lid 310 has an area 324 between the peripheries 316, 318 that will become laser welded to an inkjet printhead body (not shown). Even further, the first component 312 may or may not extend into the thickness h of the second component and the invention embraces both.

While heretofore two external-to-the-printhead-lid molds have been used in forming the inkjet printhead lid, the invention further contemplates that either the first or second component can also act as a mold during the formation of the lid. For example, in FIGS. 4A–4C, we begin with a first mold 400 having a raised portion 402 in an interior 404 thereof. When an injection molding material fills the space between the periphery 410 of the raised portion and the wall sections 406 of the first mold, and becomes cured, a first component 420 of the inkjet printhead lid becomes formed.

Since this first component has a void or an opening 422 of dimensions comparable to the dimensions of the raised portion, the opening itself can act as a second mold. Thus, upon injecting a second injection molding material into the opening, and curing the same, a complete inkjet printhead lid 430 can become formed. As shown, the inkjet printhead lid 430 has two components 420, 432 with the first component embodying a material having laser light transparency characteristics and the second component 432 embodying a material having light opacity characteristics.

It should be appreciated that while inkjet printhead lid 430, and all previous embodiments, have depicted the component of the lid with laser light transparency characteristics as surrounding the component with light opacity characteristics that either component can surround the other component. It is even contemplated that neither component surrounds the other and that the component having laser light transparency characteristics only exists in specific areas requiring laser welding as shown, see FIG. 6, for example.

Figure 5:
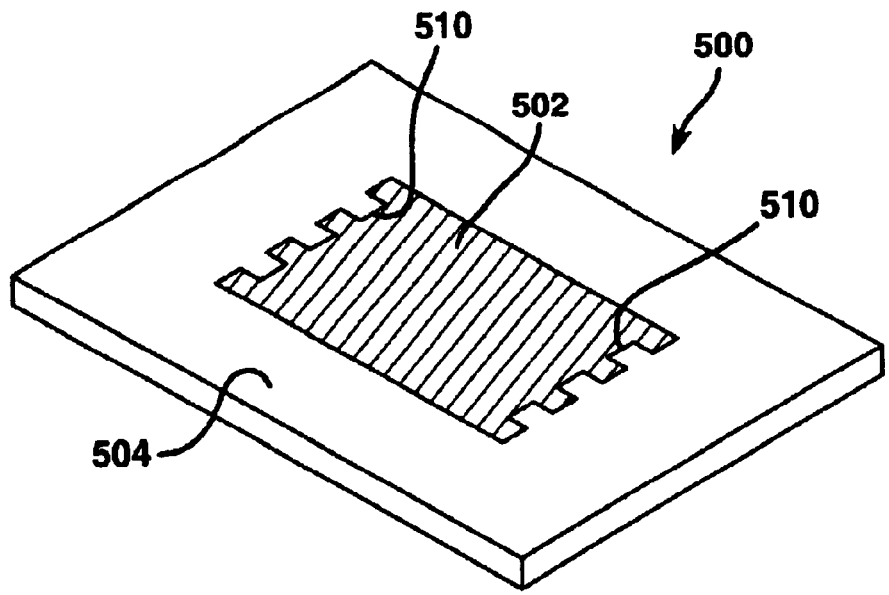
FIG. 5 is a diagrammatic perspective view in accordance with the teachings of the present invention of a two shot molded lid having features mechanically interlocking the inner and outer lids.
Figure 6:
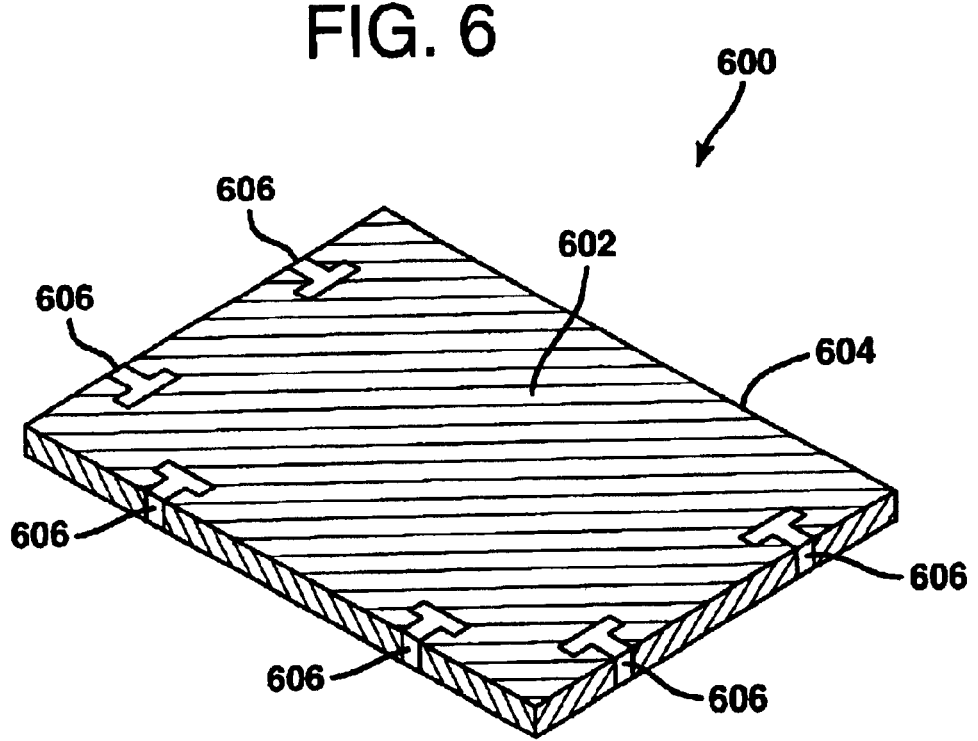
FIG. 6 is a diagrammatic perspective view in accordance with the teachings of the present invention of an alternate embodiment of a two shot molded lid having features mechanically interlocking the inner and outer lids.

In another aspect of the invention, the inner and outer lid components may additionally have mechanical interlocking features for increasing the structural integrity of the inkjet printhead lid. With reference to FIGS. 5 and 6, two embodiments of mechanical interlocking features are shown. In FIG. 5, the inkjet printhead lid 500 has an inner lid portion 502 and an outer lid portion 504 with one having light opacity characteristics and the other having laser light transparency characteristics. At a common molding interface 510 between the two components, a molded toothed or notched pattern exists. In FIG. 6, along a surface 602 of an inkjet printhead 600, the molding interface between the two lid components 604, 606 includes T-shaped patterns as the mechanical interlocking features. Those skilled in the art will appreciate that any variety of interlocking patterns exist and that the invention embraces all such embodiments.

Figure 7:
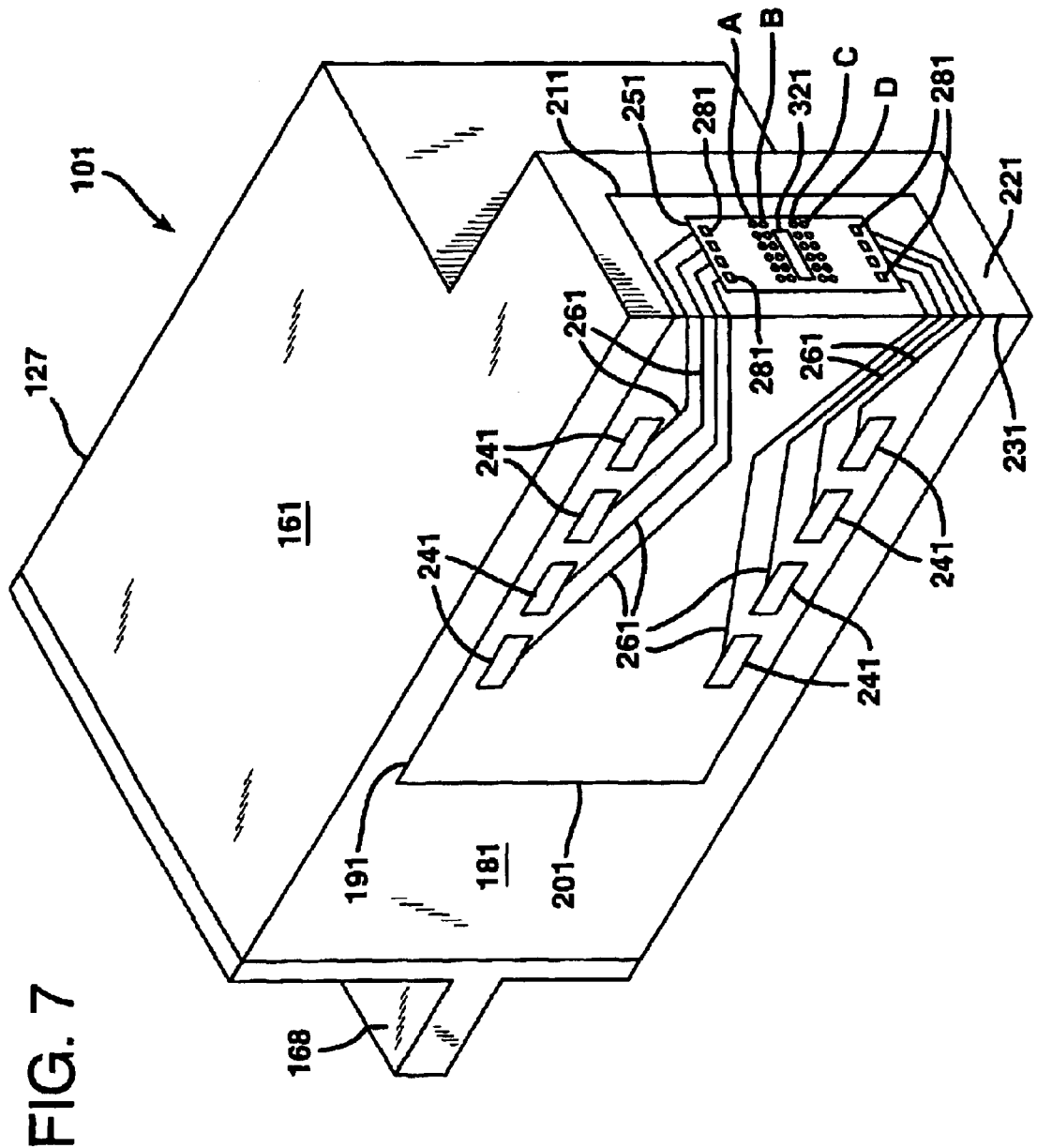
FIG. 7 is a perspective view in accordance with the teachings of the present invention of an inkjet printhead having a two shot molded lid laser welded to an inkjet printhead body.
Figure 8:
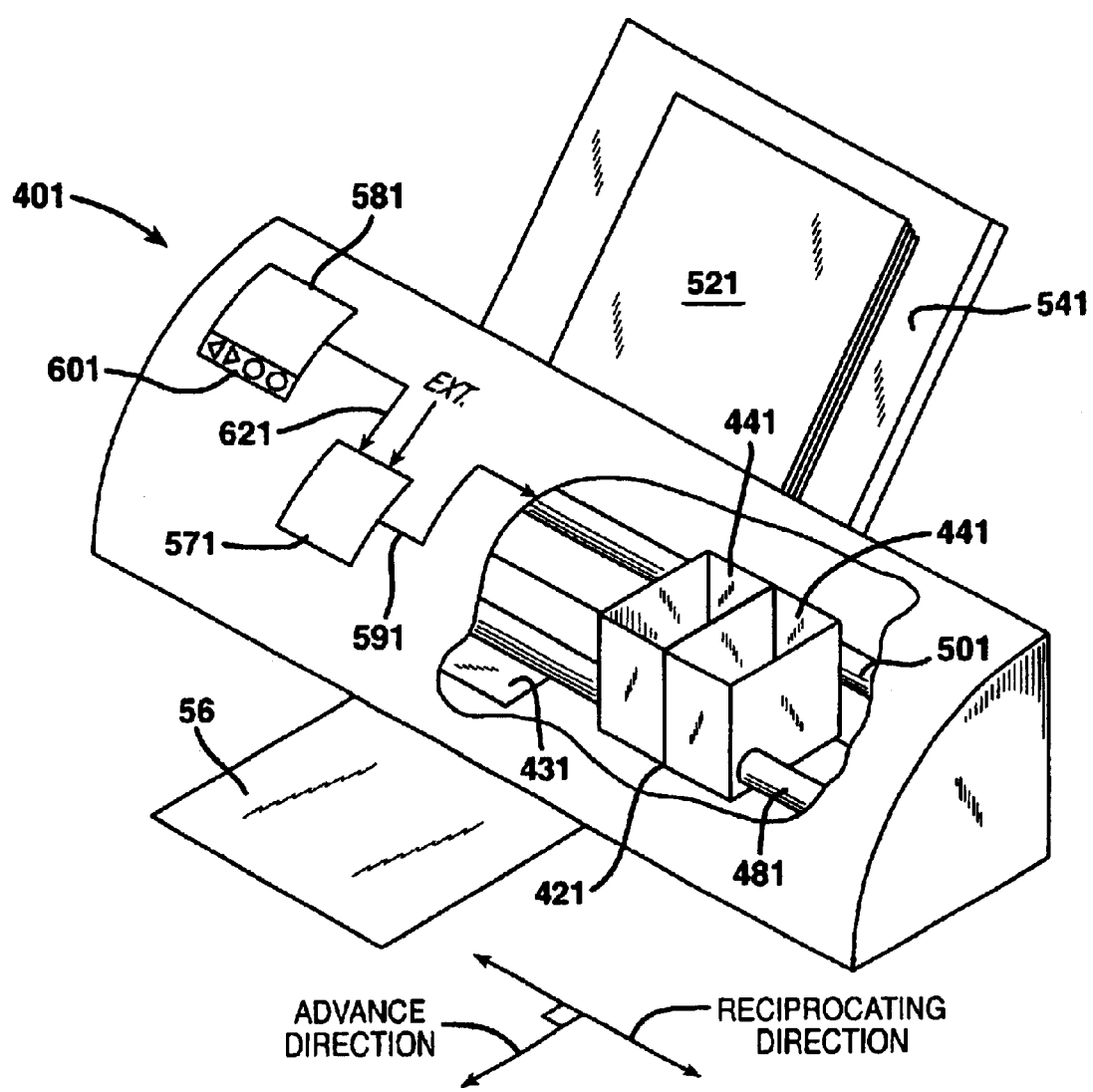
FIG. 8 is a perspective view in accordance with the teachings of the present invention of an inkjet printer for housing an inkjet printhead having a two shot molded lid laser welded to an inkjet printhead body.

Since the lid of the present invention embodies an inkjet printhead lid which welds to an inkjet printhead body, in FIGS. 7 and 8 we describe other functional aspects of an inkjet printhead and the printer that uses them. In particular, with reference to FIG. 7, a printhead of the present invention is shown generally as 101. The printhead 101 has a housing 121 formed of a body 161 and a lid 160 having two components thereof with one having laser light transparency characteristics and the other having light opacity characteristics. The shape of the housing varies and depends upon the external device that carries or contains the printhead, the amount of ink to be contained in the printhead and whether the printhead contains one or more varieties of ink. In any embodiment, the housing has at least one compartment, internal thereto, for holding an initial or refillable supply of ink and a structure, such as a foam insert, lung or other, for maintaining appropriate backpressure in the inkjet printhead during use. In one embodiment, the internal compartment includes three chambers for containing three supplies of ink, especially cyan, magenta and yellow ink. In other embodiments, the compartment may contain black ink, photo-ink and/or plurals of cyan, magenta or yellow ink. It will be appreciated that fluid connections (not shown) may exist to connect the compartment(s) to a remote source of ink.

A portion 191 of a tape automated bond (TAB) circuit 201 adheres to one surface 181 of the housing while another portion 211 adheres to another surface 221. As shown, the two surfaces 181, 221 exist perpendicularly to one another about an edge 231.

The TAB circuit 201 has a plurality of input/output (I/O) connectors 241 fabricated thereon for electrically connecting a heater chip 251 to an external device, such as a printer, fax machine, copier, photo-printer, plotter, all-in-one, etc., during use. Pluralities of electrical conductors 261 exist on the TAB circuit 201 to electrically connect and short the I/O connectors 241 to the bond pads 281 of the heater chip 251 and various manufacturing techniques are known for facilitating such connections. It will be appreciated that while eight I/O connectors 241, eight electrical conductors 261 and eight bond pads 281 are shown, any number are embraced herein. It is also to be appreciated that such number of connectors, conductors and bond pads may not be equal to one another.

The heater chip 251 contains at least one ink via 321 that fluidly connects to a supply of ink internal to the housing. During printhead manufacturing, the heater chip 25 preferably attaches to the housing with any of a variety of adhesives, epoxies, etc. well known in the art. As shown, the heater chip contains four rows (rows A–row D) of heaters. For simplicity in this crowded figure, dots depict the heaters in the rows. It will be appreciated that the heaters of the heater chip preferably become formed as a series of thin film layers made via growth, deposition, masking, photolithography and/or etching or other processing steps. A nozzle plate with pluralities of nozzle holes, not shown, adheres over the heater chip such that the nozzle holes align with the heaters.

With reference to FIG. 8, an external device, in the form of an inkjet printer, for containing the printhead 101 is shown generally as 401. The printer 401 includes a carriage 421 having a plurality of slots 441 for containing one or more printheads. The carriage 421 is caused to reciprocate (via an output 591 of a controller 571) along a shaft 481 above a print zone 461 by a motive force supplied to a drive belt 501 as is well known in the art. The reciprocation of the carriage 421 is performed relative to a print medium, such as a sheet of paper 521, that is advanced in the printer 401 along a paper path from an input tray 541, through the print zone 461, to an output tray 561.

In the print zone, the carriage 421 reciprocates in the Reciprocating Direction generally perpendicularly to the paper Advance Direction as shown by the arrows. Ink drops from the printheads are caused to be ejected from the heater chip 251 (FIG. 7) at such times pursuant to commands of a printer microprocessor or other controller 571. The timing of the ink drop emissions corresponds to a pattern of pixels of the image being printed. Often times, such patterns are generated in devices electrically connected to the controller (via Ext. input) that are external to the printer such as a computer, a scanner, a camera, a visual display unit, a personal data assistant, or other.

To print or emit a single drop of ink, the heaters (the dots of rows A–D, FIG. 7) are uniquely addressed with a small amount of current to rapidly heat a small volume of ink. This causes the ink to vaporize in a local ink chamber and be ejected through, and projected by, a nozzle plate towards the print medium.

A control panel 581 having user selection interface 601 may also provide input 621 to the controller 571 to enable additional printer capabilities and robustness.

As described herein, the term inkjet printhead may in addition to thermal technology include piezoelectric technology, or other, and may embody a side-shooter structure instead of the top-shooter structure shown. Finally, since the to-be-welded work pieces described above may embody an inkjet printhead lid and body and since laser welding imparts essentially no vibratory motion in the work pieces, unlike ultrasonic welding, less cracking of the heater chip occurs and less air becomes entrained in the ink during printhead manufacturing.

With reference to FIGS. 9A–9F, we depict an injection molding chamber 900 having a stationary portion 902 and a retractable mold portion 904 for forming the previously described inkjet printhead lid(s) of the present invention with two shots of injection material. The retractable mold portion has a first and second source of injection material 910, 912 that remotely or locally connects (as indicated by the broken lines) to molding injectors 906, 908. In a preferred embodiment, the two sources comprise injection materials that have either laser light transparency characteristics or light opacity characteristics.

Connected to the injectors, at ends opposite the sources 910, 912, are injection material conduit paths 914, 916 that fluidly terminate at first halves 918, 920 of first and second molds.

Figure 9G:
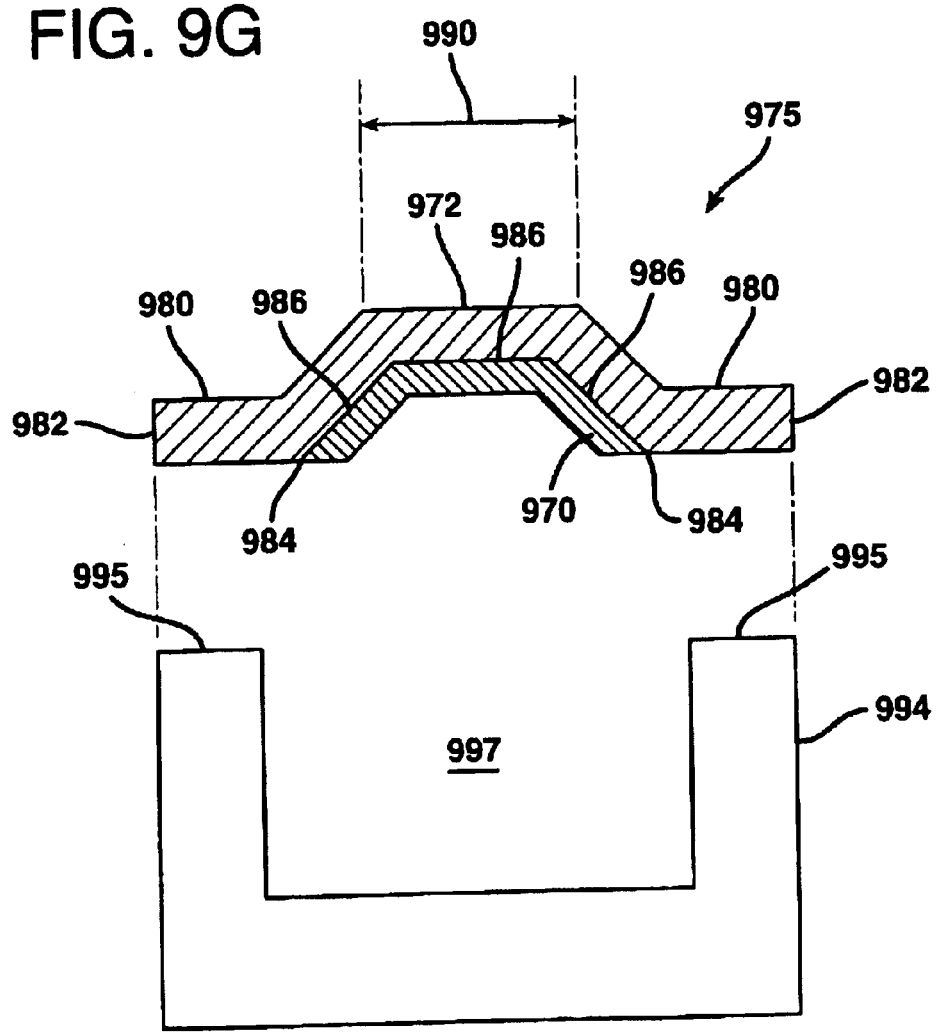
FIG. 9G is a diagrammatic view in accordance with the teachings of the present invention of a two shot molded inkjet printhead lid formed by the processes of FIGS. 9A–9F being laser welded to an inkjet printhead body.
Figure 2A:
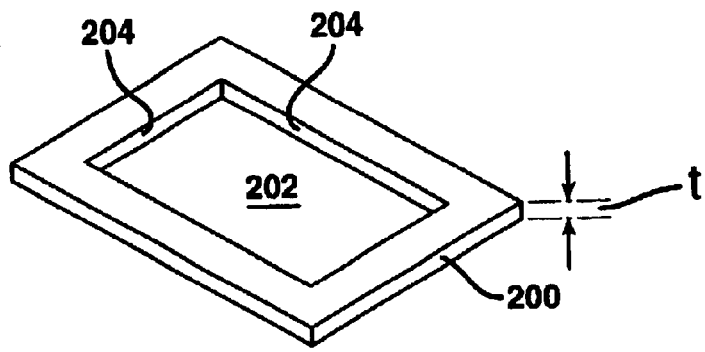
FIG. 2A is a diagrammatic perspective view in accordance with the teachings of the present invention of a first mold.
Figure 2B:
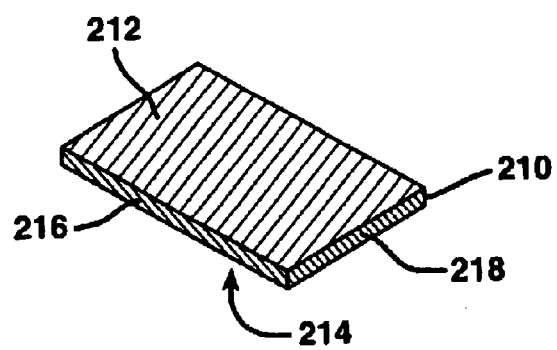
FIG. 2B is a diagrammatic perspective view in accordance with the teachings of the present invention of an insert molded from the first mold of FIG. 2A.
Figure 2C:
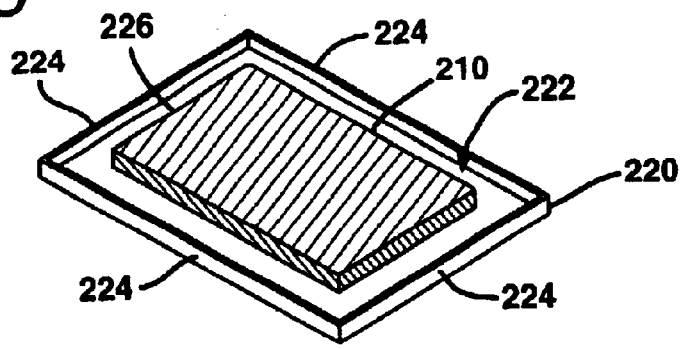
FIG. 2C is a diagrammatic perspective view in accordance with the teachings of the present invention of a second mold containing the insert of FIG. 2B.
Figure 2D:
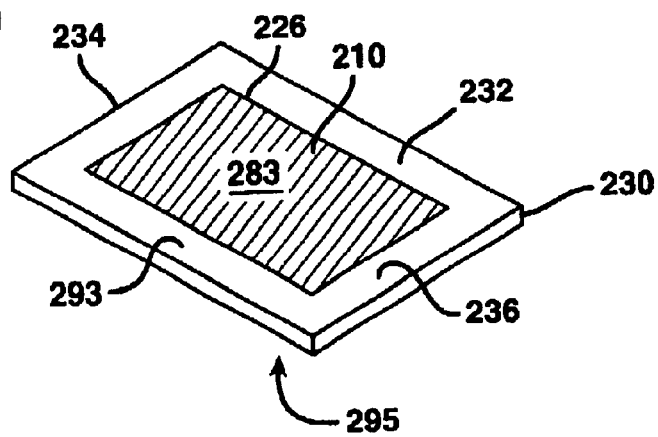
FIG. 2D is a diagrammatic perspective view in accordance with the teachings of the present invention of a two shot molded lid.
Figure 2E:
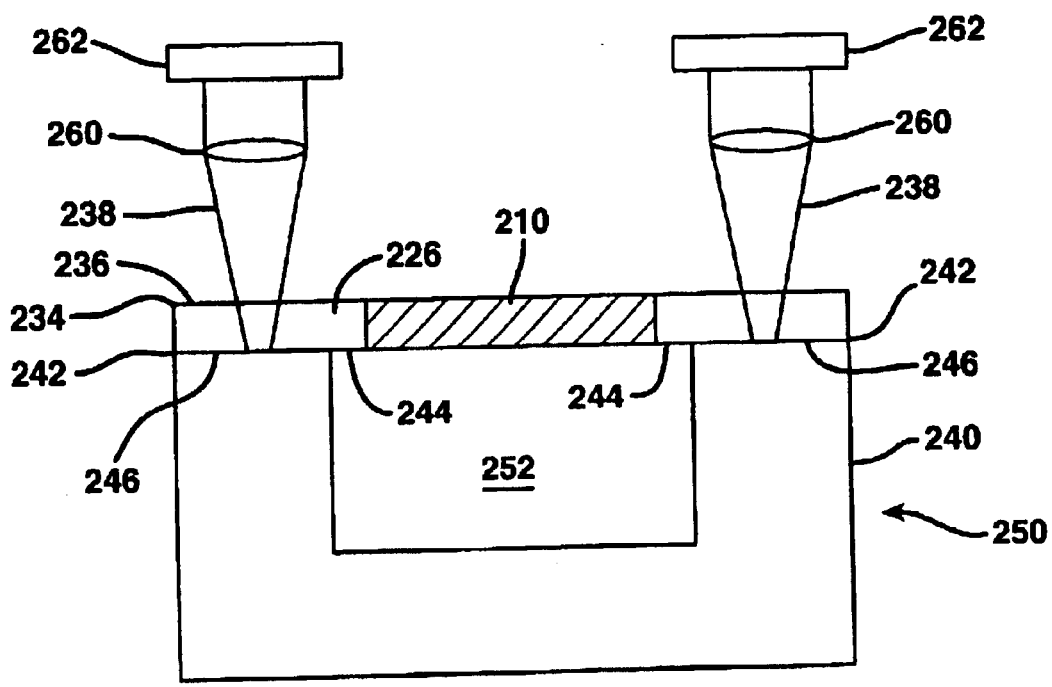
FIG. 2E is a diagrammatic view in accordance with the teachings of the present invention of the two shot molded lid of FIG. 2D being laser welded to a body.
Figure 9A:
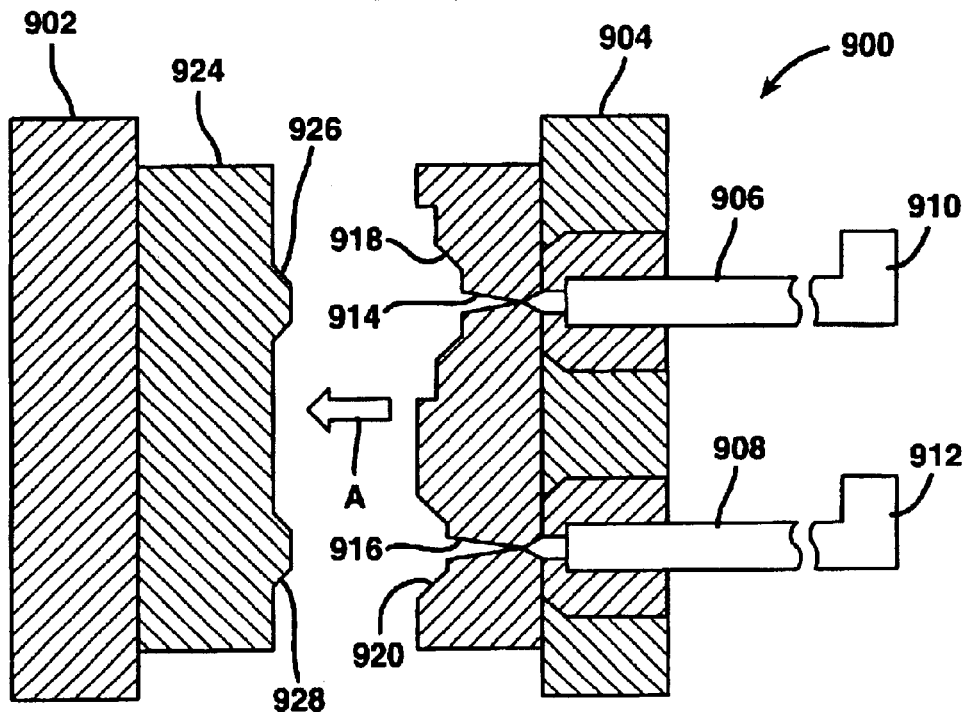
FIG. 9A is a diagrammatic view in accordance with the teachings of the present invention of a two shot molding apparatus in a pre-processing state.
Figure 9B:
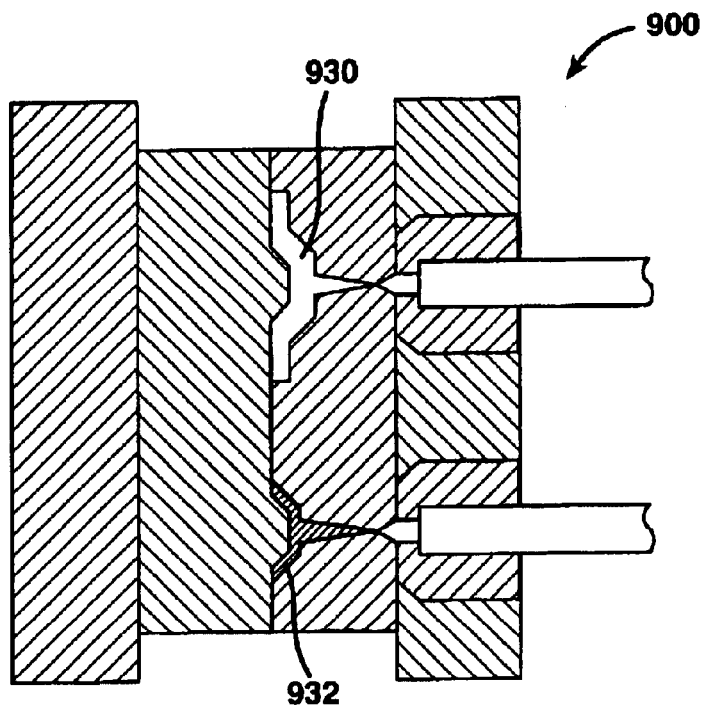
FIG. 9B is a diagrammatic view in accordance with the teachings of the present invention of a two shot molding apparatus in a first injection state.

On a platform 924 of the stationary portion 902 of the injection molding chamber reside the second halves 926, 928 of the first and second molds. During use, when the retractable mold portion 904 moves in the direction of the arrow A, a complete first and second mold become formed as the first and second halves of the first and second molds clamshell with one another. In FIG. 9B, element 930 represents the first mold. The second mold 932 has become filled by injecting injection material from the injection material source 912. This represents the first shot of the inkjet printhead lid of the present invention.

Figure 9C:
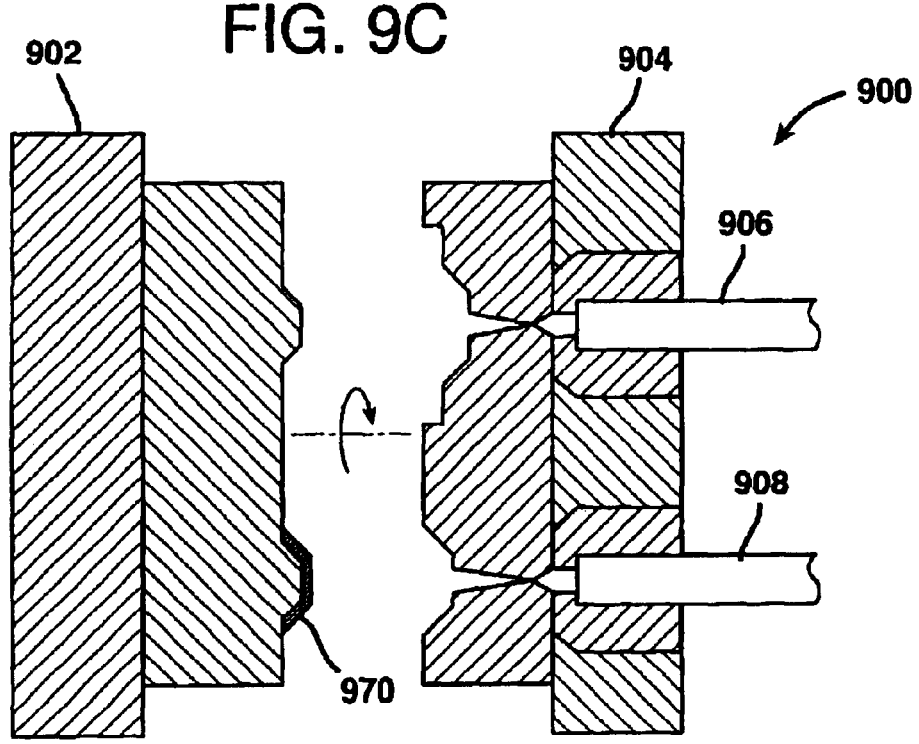
FIG. 9C is a diagrammatic view in accordance with the teachings of the present invention of a two shot molding apparatus in a post first injection state.
Figure 9D:
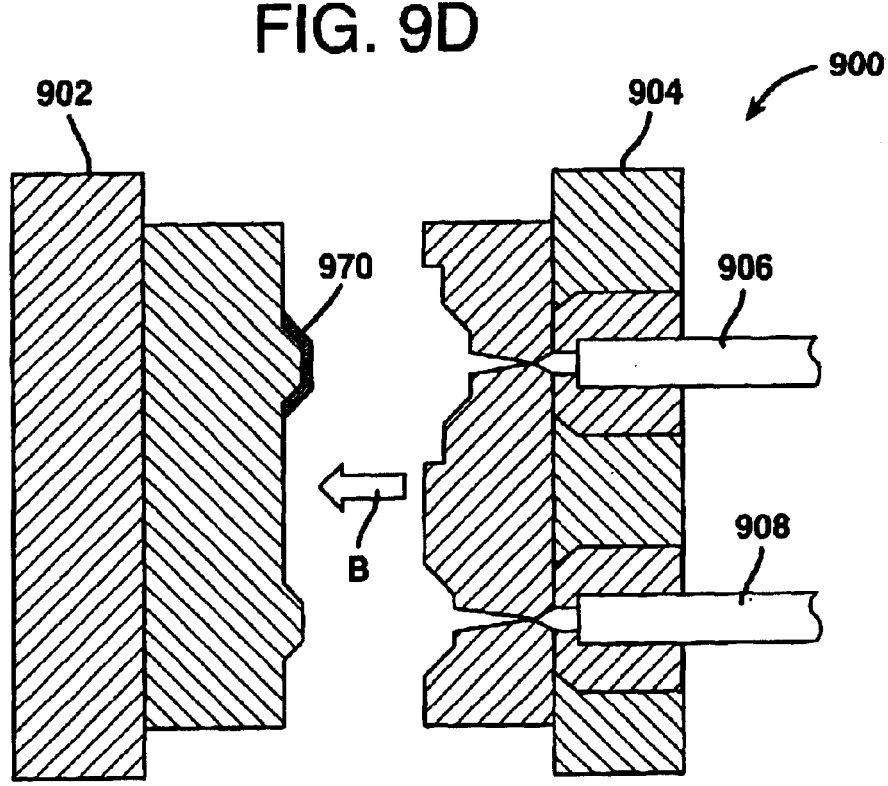
FIG. 9D is a diagrammatic view in accordance with the teachings of the present invention of a two shot molding apparatus in a rotated state.

In FIG. 9C, in a processing step subsequent to FIG. 9B, the retractable mold portion 904 separates from the stationary portion 902. A first component 970 of the inkjet printhead lid remains and has a shape comparable to the shape of the mold 932. Then, the first component becomes transferred adjacent the other of the two sources of injection materials. Transferring, in a preferred embodiment, occurs as the result of rotating the platform 924 about the dashed line axis shown. The result is that shown in FIG. 9D. In other embodiments, transferring the first component adjacent the other of the two sources of injection materials includes rotating the injectors 906, 908 of the retractable mold portion 904 about the same dashed line axis. Still other embodiments include shuttling the first component or the injectors along some appropriate conveyance path.

Figure 9E:
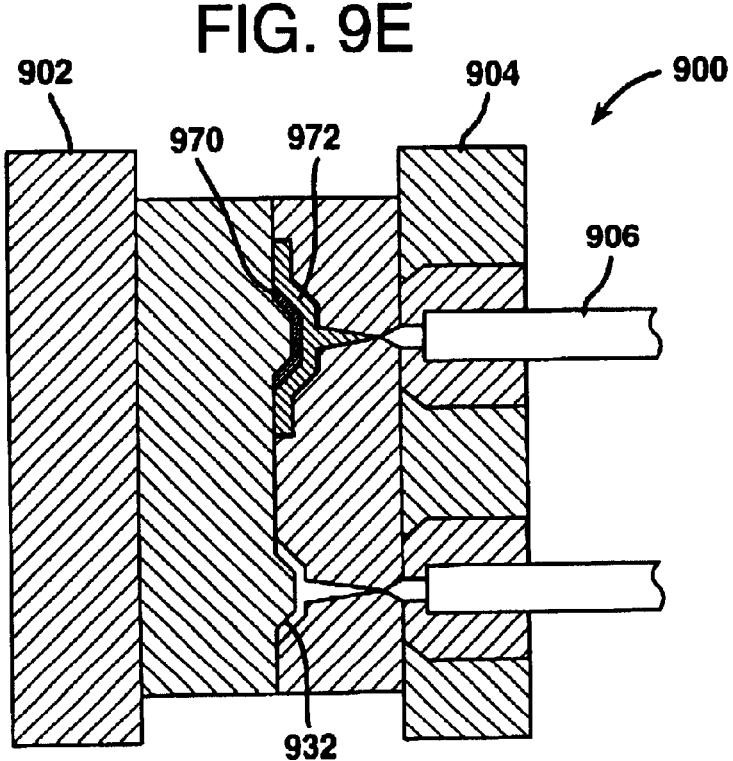
FIG. 9E is a diagrammatic view in accordance with the teachings of the present invention of a two shot molding apparatus in a second injection state.
Figure 9F:
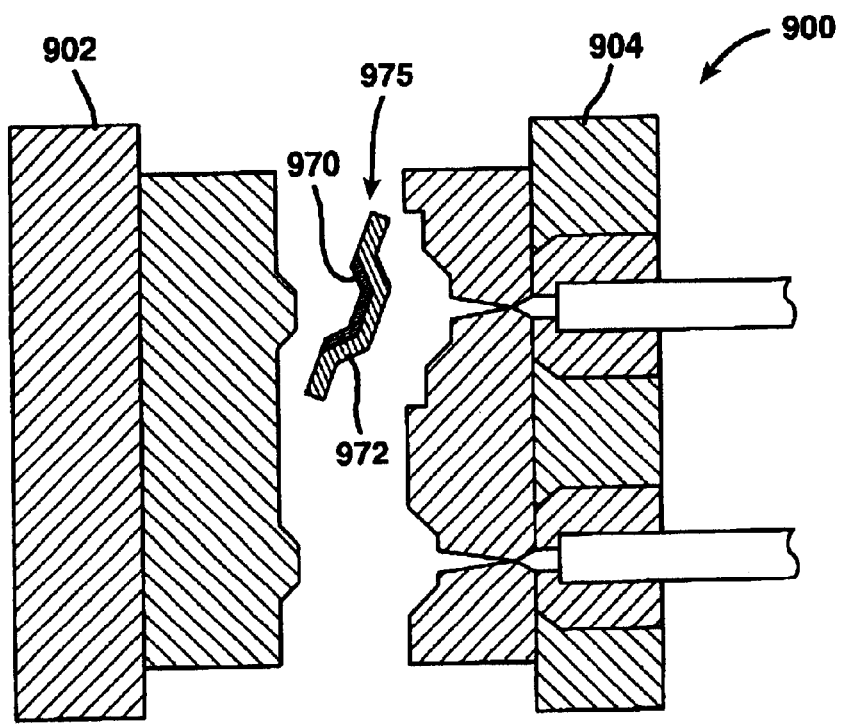
FIG. 9F is a diagrammatic view in accordance with the teachings of the present invention of a two shot molding apparatus in a processing completion state.

Then, in a processing step subsequent to that shown in FIG. 9C, the retractable mold portion 904 moves in the direction of arrow B such that the first component becomes contained in the other of the two molds. FIG. 9E shows such a result. In turn, the injection material from the first source 910 becomes injected through injector 906 to form the second component 972 of the inkjet printhead lid. Upon completion of various processing conditions, such as cure time, time of injection, cooling of the two components, etc., the two lid components mold together and form an inkjet printhead lid 975 (FIG. 9F). This represents the second shot of the inkjet printhead lid of the present invention. Finally, after retraction of the retractable mold portion 904 from the stationary portion 902, the inkjet printhead lid 975 becomes ejected from the injection molding chamber 900.

Upon close inspection (FIG. 9G), one skilled in the art should notice that the inkjet printhead lid 975 represents still another lid embodiment unique from those previously described. As shown, the lid 975 has first and second components 970, 972 having light opacity and laser light transparency characteristics, respectively, but the two components exist generally above and below one another (as oriented during attachment to an inkjet printhead body). Similar to other embodiments, the inkjet printhead lid has an area 980 that exists between the peripheries 982 and 984 of the two components that will eventually become laser welded to an inkjet printhead body 994 along weld interfaces 995. In a central region of the lid, generally 990, a region of light opacity exists such that any contents in interior 997 will remain hidden from a user's sight. As is apparent, both of the components share substantially coplanar surfaces (such as at mold interfaces 986).

The foregoing description is presented for purposes of illustration and description of the various aspects of the invention. The descriptions are not intended to be exhaustive or to limit the invention to the precise form disclosed. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of injection molding an inkjet printhead lid, comprising:
   providing an injection molding chamber with two sources of injection material, one of the two sources of injection material having light opacity characteristics and the other of the two sources of injection material having laser light transparency characteristics;
   injecting a first mold with a first of the two sources of injection material to form a first inkjet printhead lid component;
   injecting a second mold with a second of the two sources of injection material to form a second inkjet printhead lid component; and
   molding the first and second inkjet printhead lid components together.

2. The method of claim 1, wherein the injecting the second mold and the molding the first and second inkjet printhead lid components together happens substantially simultaneously.

3. The method of claim 1, further including transferring the first inkjet printhead lid component to a position adjacent the second of the two sources.

4. A method of injection molding an inkjet printhead lid, comprising:
   providing an injection molding chamber with two sources of injection material, one of the two sources of injection material having light opacity characteristics and the other of the two sources of injection material having laser light transparency characteristics;
   injecting a first mold with a first of the two sources of injection material to form a first inkjet printhead lid component having a first periphery;
   transferring the first inkjet printhead lid component to a position adjacent a second of the two sources of injection material;
   injecting a second mold with the second of the two sources of injection material to form a second inkjet printhead lid component having a second periphery extending beyond the first periphery o n substantially all sides thereof; and
   substantially simultaneously with the injecting the second mold, molding the first and second inkjet printhead lid components together.

5. The method of claim 4, wherein the injecting the first mold with the first of the two sources of injection material further includes injecting the one of the two sources of injection material.

6. The method of claim 4, wherein the injecting the second mold with the second of the two sources of injection material further includes injecting the one of the two sources of injection material.

* * * * *